Figure 1:
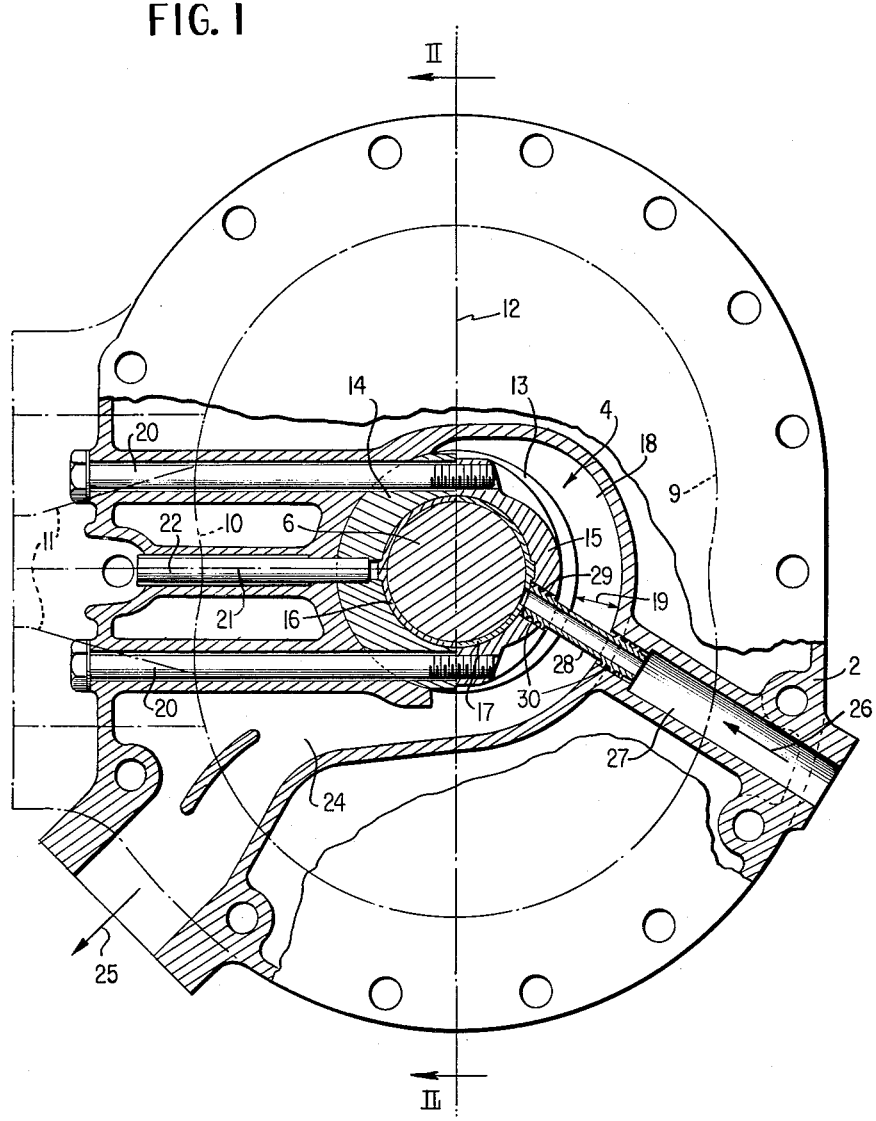

July 5, 1966  WOLF-DIETER BENSINGER ETAL  3,259,115
ROTARY-PISTON INTERNAL COMBUSTION ENGINE
Filed Nov. 19, 1963                                   2 Sheets-Sheet 2

INVENTORS.
WOLF-DIETER BENSINGER
HANS-OTTO DERNDINGER
RAINER SCHICK
HELMUT DOBLER
BY
Dicke + Craig
ATTORNEYS.

United States Patent Office 3,259,115
Patented July 5, 1966

3,259,115
ROTARY-PISTON INTERNAL COMBUSTION ENGINE
Wolf-Dieter Bensinger, Stuttgart-Unterturkheim, Hans-Otto Derndinger, Stuttgart-Wangen, Rainer Schick, Esslingen-St. Bernhard, and Helmut Dobler, Stuttgart-Mohringen, Germany, assignors to Daimler-Benz Aktiengesellschaft, Stuttgart-Unterturkheim, Germany
Filed Nov. 19, 1963, Ser. No. 324,665
Claims priority, application Germany, Nov. 23, 1962, D 40,341
20 Claims. (Cl. 123—8)

The present invention relates to a rotary-piston internal combustion engine of trochoidal construction in which at least two triangular pistons are arranged one behind the other in the axial direction within a housing on eccentrics of an eccentric shaft, which pistons rotate relative to the eccentric shaft and to the housing and thereby slide with the radial seals arranged at the corners thereof along two-arched inner surfaces of the casings of the housing, and in which additionally a partition or intermediate wall is arranged between each two successive pistons which partition or intermediate wall is provided with split bearing bodies connected with one another by bolts and provided with split bearing bushing sections for the eccentric shaft.

The present invention is concerned with the aim to so construct the bearing of the eccentric shaft in the partition wall that not withstanding the use of an undivided or integral eccentric shaft, a completely satisfactory and unobjectionable assembly of the bearing is possible, that the securing and fastening of the bearing still satisfies also all the requirements when the bearing body is provided with a toothed arrangement forming a transmission for the control of the piston, and that further an oil supply and oil discharge from the bearing place is achieved which does justice to all requirements. In solution of the underlying problem, the present invention essentially consists in that with each split bearing body the one bearing body half is constructed smaller in the radial external dimensions than the bore provided in the partition wall for accommodating the bearing body and that in the part of the partition wall adjacent to this bearing body half, there is arranged a pocket starting from the bearing bore of which the radial depth and axial length corresponds to the dimensions of the oppositely disposed bearing body half.

According to a further feature of the present invention the bearing body may advantageously be subdivided in the direction of the major axis of the casing of the housing. The pocket may be arranged advantageously in that part of the partition wall which is disposed adjacent to the zone in proximity to the axis within the area of which takes place the combustion. Both bearing body halves may be drawn by means of draw-bolts from the outer boundary of the partition wall against the bearing bore in the direction toward the zone in proximity to the axis in which are arranged the gas-change channels, that is the inlet and outlet channels. Furthermore, both bearing body halves may be provided on one side thereof with a toothed arrangement forming a pinion for the control of one piston.

The pocket in the partition wall may advantageously be constructed as an oil collecting space which is in communication with the outer boundary of the housing by way of a discharge channel arranged in the partition wall which leads substantially in the direction toward the zone in proximity to the axis containing the gas exchange channels. An oil supply line to the bearing of the eccentric shaft may additionally lead through the pocket in the radial direction which is constructed within the area of the pocket as a plastic line or as a metal line jacketed or coated externally with plastic material. The plastic line or the metal pipe jacketed with plastic material can also be provided at both ends thereof with ring-shaped serrations with the aid of which the line or pipe is securely held within a bore extending through the one bearing body half and within a bore extending through the partition wall.

Accordingly, it is an object of the present invention to provide a rotary-piston internal combustion engine, especially of trochoidal construction in which a bearing support for the eccentric shaft is provided within a partition wall that is simple in construction and easy to assemble yet eliminates the drawbacks encountered with the prior art constructions of similar bearing supports.

It is another object of the present invention to provide a bearring assembly for the eccentric shaft of a rotary-piston internal combustion engine of trochoidal construction having several pistons arranged one behind the other in the axial direction which is so constructed and arranged as to permit an integral eccentric shaft, thereby obviating the need for subdividing the same for purposes of installation into the bearing.

A further object of the present invention resides in the provision of a bearing assembly for the eccentric shaft of a rotary-piston internal combustion engine of trochoidal construction which permits a simple assembly of the eccentric shaft within the bearing structure receiving the same.

A still further object of the present invention resides in the provision of a rotary-piston internal combustion engine of trochoidal construction provided within a partition wall with a split bearing assembly for the eccentric shaft of the engine which fully satisfies all requirements of the bearing even when subjected to those loads that may arise when the bearing is provided with external teeth forming a pinion for the control of one of the pistons.

Another object of the present invention resides in the provision of a rotary-piston internal combustion engine of trochoidal construction provided with a split bearing assembly of the type described hereinabove which makes possible a lubrication of the bearing, and more particularly a supply and discharge of oil that fully satisfies all requirements of the bearing.

Figure 2:
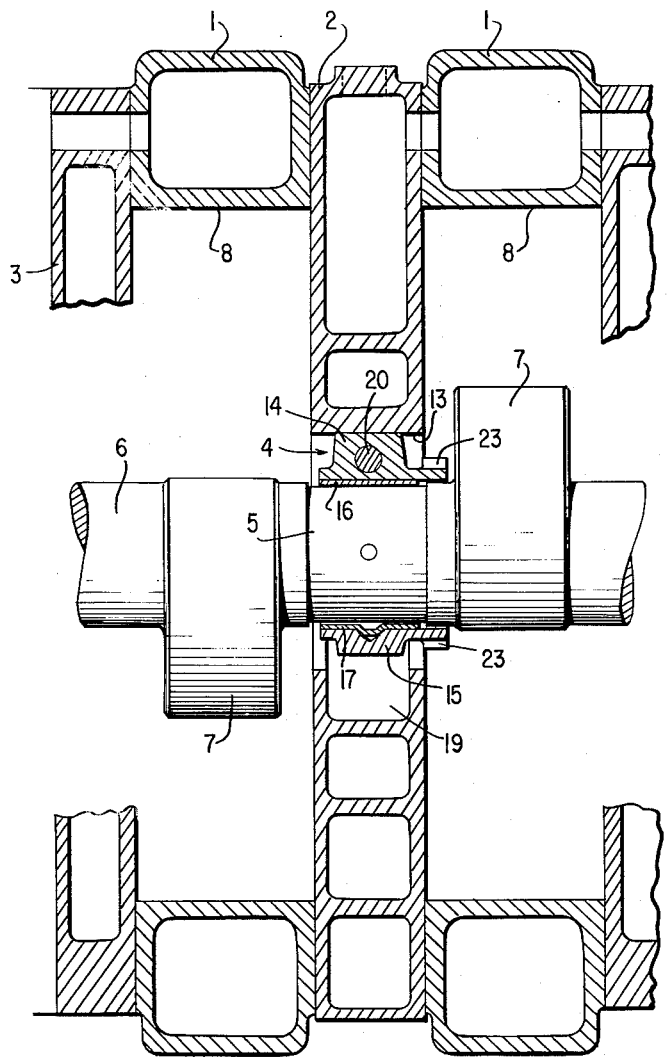

These and other objects, features and advantages of the present invention will become more obvious from the following description when taken in connection with the accompanying drawing which shows, for purposes of illustration only, one embodiment in accordancce with the present invention, and wherein:

FIGURE 1 is a transverse cross sectional view through a rotary-piston internal combustion engine of trochoidal construction taken at the place of the intermediate or partition wall which is disposed between two pistons arranged one behind the other in the axial direction, FIGURE 2 is a cross sectional view taken along line II—II of FIGURE 1, and FIGURES 3, 4 and 5 are partial somewhat schematic cross sectional views, illustrating the assembly sequence of the two bearing body halves of the bearing for the eccentric shaft within the partion wall in accordance with the present invention.

Referring now to the drawing like reference numerals are used throughout the various views to designate like parts, and more particularly to FIGURES 1 and 2 thereof, the housing of the internal combustion engine illustrated therein essentially consists of the two casings 1 (FIGURE 2), of the intermediate or partition wall 2 arranged between these two casing 1, and of the side parts 3 laterally secured to the casings 1 in any conventional manner. The section 5 of the integral or unitary eccentric shaft 6 provided with eccentrics 7 arranged on both sides of the intermediate or partition wall 2 is supported within the intermediate or partition wall 2 by means of the bearing generally designated by reference numeral 4. The eccentric shaft 6 is also suitably supported in any conventional manner (not shown) within the side parts 3 of the housing. The pistons (not shown) of the internal combustion engine are arranged on the eccentrics 7 of the eccentric shaft 6 and slide with the radial seals disposed at the corners thereof, as is also conventional, along the inner surfaces 8 of the casings 1. The inner surfaces 8 are, as indicated in dash and dot lines in FIGURE 1, constructed epitrochoidally shaped in cross-section. The inner surfaces 8 form respectively two arches and two zones 9 and 10 in proximity to the axis of the engine, that is two zones 9 and 10 more closely approaching the axis of shaft 6. The combustion takes place within the area of the zone 9 in proximity to the axis. The gas-change channels 11 consisting of the inlet and outlet channels are disposed within the area of the zone 10 in proximity to the axis.

The bearing 4 for the eccentric shaft 6 within the intermediate or partition wall 2 is constructed as sleeve bearing in which the bearing body is split in the direction of the major axis 12 of the casings 1. The bearing body halves 14 and 15 together with the split bearing sleeve sections 16 and 17 associated therewith are disposed within the bore 13 extending through the intermediate or partition wall 2 of which the diameter is larger than the diameter of the eccentrics 7. Whereas the bearing body half 14 completely fills the part of the bore 13 coordinated thereto in the radial direction, the bearing body half 15 is constructed in the radial external dimensions smaller than the part of the bore 13 coordinated thereto. The pocket 18 starting from the bore 13 is provided within the partition wall 2 within the area of the bearing body half 15. The radial depth 19 of the pocket 18 corresponds approximately to the thickness of the bearing body half 14. The bearing body half 15 together with the split bearing sleeve section 17 is drawn or tightened against the bearing body half 14 provided with the split bearing sleeve section 16 by means of draw-in or clamping bolts 20 which start from the outer boundary of the partition wall 2 within the area of the zone 10 in proximity to the axis and are disposed parallel to the minor axis 21 of the casings 1. The bearing body half 14 is thereby pressed against the part of the bore 13 subjected to ignition pressure loads. A fitted or press-fit bolt 22 inserted also from the outer boundary of the partition wall 2 secures the exact position of the bearing body half 14.

Figure 3:
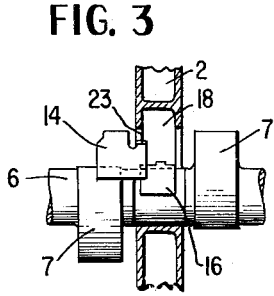
Figure 4:
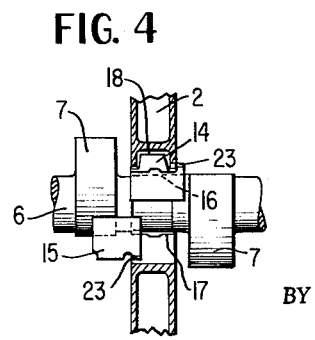
Figure 5:
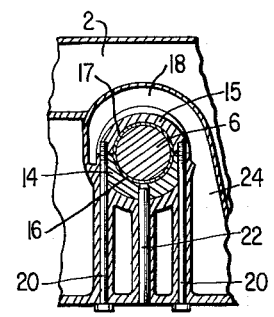

The assembly of the bearing 4 within the intermediate or partition wall 2 is realized as illustrated in FIGURES 3 to 5.

As may be seen from FIGURE 3, the eccentric shaft 6 is inserted into the bore 13 within the partition wall 2 in such a manner that the partition wall 2 is arranged between the two eccentrics 7. The eccentric shaft 6 is thereupon lowered against the wall of the bore 13, and more particularly against the part which is disposed opposite the part of the bore 13 provided with the pocket 18. The eccentric shaft 6 is thereupon rotated in such a manner that sufficient space remains between one of the eccentrics 7 and the edge of the bore 13 on one side of the partition wall 2 in order to enable the initial emplacement from there of the split bearing sleeve section 16 over the eccentric shaft 6, and subsequently to enable the introduction of the bearing body half 14 into the bore 13 and the emplacement of the same over the bearing sleeve section 16.

According to FIGURE 4 the eccentric shaft is then rotated by 180° and is lifted in such a manner that the bearing body half 14 engages into the pocket 18 of the partition wall 2. So much space remains thereby between the eccentric shaft 6 and the edge of the bore 13 on the same side from which the bearing body half 14 had been inserted in order to enable now the insertion of the split bearing sleeve section 17 and the introduction of the bearing body half 15. As soon as the bearing sleeve section 17 is pressed into the bearing body half 15, both bearing body halves 14 and 15 are rotated together with the bearing sleeve sections 16 and 17 thereof by 180° into the assembled position according to FIGURE 5 and are slightly tied or clamped together by means of the draw bolts 20. After the press-fit bolt 22 has been subsequently driven in, all of the parts of the bearing 4 are securely clamped or tightened together.

The absolutely safe securing of the bearing 4 (FIGURES 1 and 2) within the partition wall 2 and the favorable assembly possibilities described hereinabove make it possible to provide the bearing body halves 14 and 15 with teeth 23 (FIGURE 2) so that these teeth 23 form in the assembled position of the bearing a pinion which serves for the control of one of the pistons.

As may be seen particularly from FIGURE 1, the pocket 18 within the partition wall 2 is provided with channel 24 that leads substantially in the direction toward the zone 10 in proximity to the axis and terminates at the outer boundary of the partition wall 2. The pocket 18 can therefore be utilized as oil collecting space from which the collected oil can leave the internal combustion engine by way of channel 24 in the direction of arrow 25.

In case it is unfavorable or undesirable to bore the eccentric shaft 6 in the axial direction thereof and to supply oil for the lubrication especially of the bearing 4 through the eccentric shaft 6, the oil supply of the bearing 4 according to FIGURE 1 is made in such a manner that the oil is supplied from the outer boundary of the partition wall 2 in the direction of arrow 26 through the radial bore 27. The bridging of the collecting space for the oil to be drained which is formed by the pocket 18 takes place thereby by a plastic pipe 28 which is introduced into the bore 27 and leads to the bore 29 within the bearing body half 15. The plastic pipe 28 is provided at both ends thereof with ring-shaped serrations 30 so that it is seated in an absolutely tight and secure manner both in the bore 27 as well as in the bore 29.

While we have shown and described one embodiment in accoradnce with the present invention, it is understood that the same is not limited thereto but is susceptible of numerous changes and modifications within the spirit and scope thereof; and we therefore do not wish to be limited to the details shown and described herein, but intend to cover all such changes and modifications as are encompassed by the scope of the appended claims.

We claim:

1. A rotary-piston internal combustion engine of trochoidal construction, comprising:
   housing means provided with arched inner surface means,
   shaft means rotatably supported within the engine and provided with eccentric means,
   at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means,
   said housing means including partition wall means disposed between two successive piston means and provided with a bearing bore for accommodating therein said shaft means,
   and bearing means for rotatably supporting the shaft means within the bearing bore of said partition wall means including split bearing body means, and threaded means for holding together the split bearing body means,
   one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means.

2. A rotary-piston internal combustion engine of trochoidal construction, comprising:
   housing means having casings and provided with arched inner surface means effectively providing two zones in proximity to the axis of the engine,
   shaft means rotatably supported within the engine and provided with eccentric means,
   at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means,
   said housing means including partition wall means disposed between two successive piston means and provided with a bearing bore for accommodating therein said shaft means,
   and bearing means for rotatably supporting the shaft means within the bearing bore of said partition wall means including split bearing body means, and threaded means for holding together the split bearing body means,
   one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means,
   said bearing body means being split in the direction of the major axis of the casings of the housing means.

3. A rotary-piston internal combustion engine of trochoidal construction, comprising:
   holding means provided with arched inner surface means effectively providing two zones in proximity to the axis of the engine,
   shaft means rotatably supported within the engine and provided with eccentric means,
   at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means,
   said housing means including partition wall means disposed between two successive piston means and provided with a bearing bore for accommodating therein said shaft means,
   and bearing means for rotatably supporting the shaft means within the bearing bore of said partition wall means including split bearing body means and threaded means for holding together the split bearing body means,
   one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means,
   the pocket being arranged in that part of the partition wall means which is adjacent to that zone in proximity to the axis, within the area of which takes place the combustion.

4. A rotary-piston internal combustion engine of trochoidal construction, comprising:
   housing means provided with arched inner surface means,
   shaft means rotatably supported within the engine and provided with eccentric means,
   at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means,
   said housing means including partition wall means disposed between two successive piston means and provided with a bearing bore for accommodating therein said shaft means,
   and bearing means for rotatably supporting the shaft means within the bearing bore of said partition wall means including split bearing body means and threaded means including draw-bolts for holding together the split bearing body means,
   one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means,
   the two bearing body means being drawn together by said draw-bolts from the outer boundary of the partition wall means against the bearing bore in the direction against that zone in proximity to the axis in which are arranged the inlet and outlet channels.

5. A rotary-piston internal combustion engine of trochoidal construction, comprising:
   housing means provided with arched inner surface means,
   shaft means rotatably supported within the engine and provided with eccentric means,
   at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means,
   said housing means including partition wall means disposed between two successive piston means and provided with a bearing bore for accommodating therein said shaft means,
   and bearing means for rotatably supporting the shaft means within the bearing bore of said partition wall means including split bearing body means and threaded means for holding together the split bearing body means,
   one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means,
   both bearing body means being provided on one side with tooth means forming a pinion for the control of one of the piston means.

6. A rotary-piston internal combustion engine of trochoidal construction, comprising:
   housing means having casings and provided with arched inner surface means effectively providing two zones in proximity to the axis of the engine,
   shaft means rotatably supported within the engine and provided with eccentric means,
   at least two polygonal piston means disposed one behind the other in the axial direction and rotatably supported on a respective eccentric means, said piston means rotating relative to said shaft means and to said housing means and sliding within the radial seals arranged at the piston corners thereof along the inner surface means of said housing means, said housing means including partition wall means disposed between two successive piston means and provided with a bearing bore for accommodating therein said shaft means, and bearing means for rotatably supporting the shaft means within the bearing bore of said partition wall means including split bearing body means and threaded means including draw-bolts for holding together the split bearing body means, one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means, said bearing body means being split in the direction of the major axis of the casings of the housing means, the pocket being arranged in that part of the partition wall means which is adjacent to that zone is proximity to the axis, within the area of which takes place the combustion, the two bearing body means being drawn together by said draw-bolts from the outer boundary of the partition wall means against the bearing bore in the direction against the zone in proximity to the axis in which are arranged the inlet and outlet channels, both bearing body means being provided on one side with tooth means forming a pinion for the control of one of the piston means.

7. A rotary-piston internal combustion engine of trochoidal construction, comprising:

housing means provided with arched inner surface means effectively providing two zones in proximity to the axis of the engine, shaft means rotatably supported within the engine and provided with eccentric means, at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means, said housing means including partition wall means disposed between two successive piston means and provided with a bearing bore for accommodating therein said shaft means, and bearing means for rotatably supporting the shaft means within the bearing bore of said partition wall means including split bearing body means, and threaded means including draw-bolts for holding together the split bearing body means, one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means, the pocket being arranged in that part of the partition wall means which is adjacent to that zone in proximity to the axis, within the area of which takes place the combustion, the two bearing body means being drawn together by said draw-bolts from the outer boundary of the partition wall means against the bearing bore in the direction against that zone in proximity to the axis, in which are arranged the inlet and outlet channels.

8. A rotary-piston internal combustion engine of trochoidal construction, comprising:

housing means provided with arched inner surface means effectively providing two zones in proximity to the axis of the engine, shaft means within said housing means and provided with eccentric means, at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means, said housing means including partition wall means disposed between two successive piston means and provided with a bearing bore for accommodating therein said shaft means, and bearing means for rotatably supporting the shaft means within the bearing bore of said partition wall means including split bearing body means, and threaded means for holding together the split bearing body means, one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means, said pocket forming an oil collecting space, and discharge channel means arranged within the partition wall means and leading substantially in the direction to the zone in proximity to the axis provided with the inlet and outlet channels for establishing a communication with the outer boundary of the housing.

9. A rotary-piston internal combustion engine of trochoidal construction, comprising:

housing means provided with arched inner surface means effectively providing two zones in proximity to the axis of the engine, shaft means within said housing means and provided with eccentric means, at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means, said housing means including partition wall means disposed between two successive piston means and provided with a bearing bore for accommodating therein said shaft means, and bearing means for rotatably supporting the shaft means within the bearing bore of said partition wall means including split bearing body means, and threaded means for holding together the split bearing body means, one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means, said pocket forming an oil collecting space, and discharge channel means arranged within the partition wall means and leading substantially in the direction to the zone in proximity to the axis provided with the inlet and outlet channels for establishing a communication with the outer boundary of the housing, and oil supply line means leading to the bearing means for the shaft means substantially in the radial direction through the pocket.

10. The combination according to claim 9, wherein said supply line means is constructed within the area of said pocket as a plastic tubing.

11. The combination according to claim 9, wherein said supply line means is constructed within the area of said pocket as a metallic tubing covered externally with plastic material.

12. A rotary-piston internal combustion engine of trochoidal construction, comprising:

housing means provided with arched inner surface means effectively providing two zones in proximity to the axis of the engine, shaft means within said housing means and provided with eccentric means, at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means, said housing means including partition wall means disposed between two successive piston means and provided with a bearing bore for accommodating therein said shaft means, and bearing means for rotatably supporting the shaft means within the bearing bore of said partition wall means including split bearing body means, and threaded means for holding together the split bearing body means, one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means, said pocket forming an oil collecting space, and discharge channel means arranged within the partition wall means and leading substantially in the direction to the zone in proximity ot the axis provided with the inlet and outlet channels for establishing a communication with the outer boundary of the housing, and oil supply line means leading to the bearing means for the shaft means substantially in the radial direction through the pocket, said supply line means being provided at both ends thereof with ring-shaped serrations to securely hold, by a press-fit, said supply line means in place within a bore provided within one of said bearing body means and within a bore provided within the partition wall means.

13. A rotary-piston internal combustion engine of trochoidal construction, comprising:

housing means having casings and provided with arched inner surface means effectively providing two zones in proximity to the axis of the engine, shaft means within said housing means and provided with eccentric means, at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means, said housing means including partition wall means disposed between two successive piston means and provided with a bearing bore for accommodating therein said shaft means, and bearing means for rotatably supporting the shaft means within the bearing bore of said partition wall means including split bearing body means, and threaded means including draw-in bolts for holding together the split bearing body means, one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means, said bearing body means being split in the direction of the major axis of the casings of the housing means, the pocket being arranged in that part of the partition wall means which is adjacent to the zone in proximity to the axis within the area of which takes place the combustion, and the two bearing body means being drawn together by said draw-in bolts from the outer boundary of the partition wall means against the bearing bore in the direction against the zone in proximity to the axis in which are arranged the inlet and outlet channels, both bearing body means being provided on one side with tooth means forming a pinion for the control of one of the piston means, said pocket forming an oil collecting space, and discharge channel means arranged within the partition wall means and leading susbtantially in the direction to the zone in proximity to the axis provided with the inlet and outlet channels for establishing a communication with the other boundary of the housing, and oil supply line means leading to the bearing means for the shaft means substantially in the radial direction through the pocket, said supply line means being provided at both ends thereof with ring-shaped serrations ot securely hold, by a press-fit, said supply line means in place within a bore provided within one of said bearing body means and within a bore provided within the partition wall means.

14. A rotary-piston internal combustion engine of trochoidal construction, comprising:

housing means having casings and provided with arched inner surface means effectively providing two zones in proximity to the axis of the engine, shaft means within said housing means and provided with eccentric means, at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means, said housing means including partition wall means disposed between two successive piston means and provided with a bearing bore for accommodating therein said shaft means, and bearing means for rotatably supporting the shaft means within the bearing bore of said partition wall means including split bearing body means, and threaded means including draw-in bolts for holding together the split bearing body means, one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means, said bearing body means being split in the direction of the major axis of the casings of the housing means, the pocket being arranged in that part of the partition wall means which is adjacent to the zone in proximity to the axis within the area of which takes place the combustion, and the two bearing body means being drawn together by said draw-in bolts from the other boundary of the partition wall means against the bearing bore in the direction against the zone in proximity to the axis, in which are arranged the inlet and outlet channels, both bearing body means being provided on one side with tooth means forming a pinion for the control of one of the piston means, said pocket forming an oil collecting space, and discharge channel means arranged within the partition wall means and leading substantially in the direction to the zone in proximity to the axis provided with the inlet and outlet channels for establishing a communication with the outer boundary of the housing, and oil supply line means leading to the bearing means for the shaft means substantially in the radial direction through the pocket.

15. A rotary-piston internal combustion engine of trochoidal construction, comprising:

housing means provided with arched inner surface means effectively providing two zones in proximity to the axis of the engine, shaft means within said housing means and provided with eccentric means, at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means, said housing means including partition wall means disposed between two successive piston means and provided with a bearing bore for accommodating therein said shaft means, and bearing means for rotatably supporting the shaft means within the bearing bore of said partition wall means including split bearing body means, and threaded means for holding together the split bearing body means, one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means, the pocket being arranged in that part of the partition wall means which is adjacent to the zone in proximity to the axis within the area of which takes place the combustion, and the two bearing body means being drawn together by said draw-in bolts from the outer boundary of the partition wall means against the bearing bore in the direction against zone in proximity to the axis in which are arranged the inlet and outlet channels, said pocket forming an oil collecting space, and discharge channel means arranged within the partition wall means and leading substantially in the direction to the zone in proximity to the axis provided in the inlet and outlet channels for establishing a communication with the outer boundary of the housing.

16. A rotary-piston internal combustion engine of trochoidal construction, comprising:

housing means provided with arched inner surface means effectively providing two zones in proximity to the axis of the engine, shaft means within said housing means and provided with eccentric means, at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means, said housing means including partition wall means disposed between two successive piston means and provided with a bearing bore for accommodating therein said shaft means, and bearing means for rotatably supporting the shaft means within the bearing bore of said partition wall means including split bearing body means, and threaded means for holding together the split bearing body means, one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means, the pocket being arranged in that part of the partition wall means which is adjacent to the zone in proximity to the axis within the area of which takes place the combustion, and the two bearing body means being drawn together by said draw-in bolts from the outer boundary of the partition wall means against the bearing bore in the direction against the zone in proximity to the axis in which are arranged the inlet and outlet channels, said pocket forming an oil collecting space, and discharge channel means arranged within the partition wall means and leading substantially in the direction to the zone in proximity to the axis provided with the inlet and outlet channels for establishing a communication with the outer boundary of the housing, and oil supply line means leading to the bearing means for the shaft means substantially in the radial direction through the pocket.

17. A rotary-piston internal combustion engine of trochoidal construction, comprising:

housing means having casings and provided with arched inner surface means effectively providing two zones in proximity to the axis of the engine, shaft means within said housing means and provided with eccentric means, at least two polygonal piston means disposed one behind the other in the axial direction and rotatably supported on a respective eccentric means, said piston means rotating relative to said shaft means and to said housing means and sliding with the radial seals arranged at the piston corners thereof along the inner surface means of said housing means, said housing means including partition wall means disposed between two successive piston means and provided with a bearing bore for accommodating therein said shaft means, and bearing means for rotatably supporting the shaft means within the bearing bore of said partition wall means including split bearing body means, and threaded means including draw-in bolts for holding together the split bearing body means, one of the bearing body means being constructed with the outer radial dimension thereof smaller than the bearing bore provided in said partition wall means, and a pocket provided within the partition wall means adjacent to said one bearing body means and starting from the bearing bore, the radial depth of said pocket corresponding substantially to the dimensions of the oppositely disposed bearing body means, said bearing body means being split in the direction of the major axis of the casings of the housing means, both bearing body means being provided on one side with tooth means forming a pinion for the control of one of the piston means, said pocket forming an oil collecting space, and discharge channel means arranged within the partition wall means and leading substantially in the direction to the zone in proximity to the axis provided with the inlet and outlet channels for establishing a communication with the outer boundary of the housing, and oil supply line means leading to the bearing means for the shaft means substantially in the radial direction through the pocket, said supply line means being provided at both ends thereof with ring-shaped serrations to securely hold, by a press-fit, said supply line means in place with a bore provided within one of said bearing body means and within a bore provided within the partition wall means.

18. In a rotary-piston internal combustion engine of trochoidal construction, which includes an engine housing effectively forming curved inner surfaces, a shaft rotatably supported in the engine and provided with eccentrics, and at least two polygonal rotary pistons disposed one behind the other in the axial direction thereof and rotatably supported on a respective eccentric, with the pistons rotating relative to the shaft and to the housing and sliding with the radial seals thereof arranged at the piston corners along the inner surfaces of said housing, and a partition wall provided with a bearing bore and disposed between two successive pistons in said housing, the improvement essentially consisting of an integral engine shaft provided with said eccentrics, and split bearing means for receiving said engine shaft within said partition wall including split bearing bodies, one of the bearing bodies being constructed with the external dimension thereof smaller than the bearing bore, a pocket within the partition wall adjacent to said one bearing body and in communication with the bearing bore, and the radial depth of said pocket corresponding substantially to the dimensions of the oppositely disposed bearing body.

19. In a rotary-piston internal combustion engine of trochoidal construction, which includes an engine housing effectively forming curved inner surfaces, a shaft rotatably supported in the engine and provided with eccentrics, and at least two polygonal rotary pistons disposed one behind the other in the axial direction thereof and rotatably supported on a respective eccentric, with the pistons rotating relative to the shaft and to the housing and sliding with the radial seals thereof arranged at the piston corners along the inner surfaces of said housing, and a partition wall provided with a bearing bore and disposed between two successive pistons in said housing, the improvement essentially consisting of an integral engine shaft provided with said eccentrics, and split bearing means for receiving said engine shaft within said partition wall including two split bearing bodies, one of the bearing bodies being constructed with the external dimension thereof smaller than the bearing bore, a pocket within the partition wall adjacent to said one bearing body and in communication with the bearing bore, and the radial depth of said pocket and the axial length thereof corresponding substantially to the dimensions of the oppositely disposed bearing body.

20. In a rotary-piston internal combustion engine of trochoidal construction, which includes an engine housing effectively forming curved inner surfaces, a shaft rotatably supported in the engine and provided with eccentrics, and at least two polygonal rotary pistons disposed one behind the other in the axial direction thereof and rotatably supported on a respective eccentric, with the piston rotating relative to the shaft and to the housing and sliding with the radial seals thereof arranged at the piston corners along the inner surfaces of said housing, and a partition wall provided with a bearing bore and disposed between two successive pistons in said housing, the improvement essentially consisting of an integral engine shaft provided with said eccentrics, and split bearing means for receiving said engine shaft within said partition wall including split bearing bodies, one of the bearing bodies being constructed with the external dimension thereof smaller than the bearing bore, a pocket within the partition wall adjacent to said one bearing body and in communication with the bearing bore, and the radial depth of said pocket corresponding substantially to the dimensions of the oppositely disposed bearing body, the pocket being arranged in that part of the partition wall which is adjacent to the zone in proximity to the axis, within the area of which takes place the combustion.

No references cited.

SAMUEL LEVINE, *Primary Examiner.*

F. T. SADLER, *Assistant Examiner.*